NONDESTRUCTIVE MEMORY ARRAY

Filed April 19, 1965

INVENTORS
ARNOLD S. FARBER
EUGENE S. SCHLIG

S. P. Tedesco
ATTORNEY 3,354,440
NONDESTRUCTIVE MEMORY ARRAY

Arnold S. Farber, Yorktown Heights, and Eugene S. Schlig, Croton Falls, N.Y., assignors to International Business Machines Corporation, Armonk, N.Y., a corporation of New York Filed Apr. 19, 1965, Ser. No. 449,093
18 Claims. (Cl. 340—173)

This invention relates to large capacity memory arrays employing threshold-type storage devices. In accordance with particular aspects of this invention, such memory arrays are operative in a nondestructive mode without the need to clear a word address prior to a write operation.

Many requirements of present day computer systems are best satisfied by nondestructive random access memory arrays. A nondestructive random access memory array is defined as one wherein interrogation (read) is effected on a word basis without destruction of the stored information. Such memory arrays inherently exhibit shorter cycle times than do memory arrays operative in the destructive mode as interrogation of the latter necessarily includes a regenerative operation whereby information is rewritten in the word address. Prior art memory arrays, both destructive and nondestructive, require an initial resetting, or clearance, of a word address prior to information storage (write). In such memory arrays, both information storage (write) and interrogation (read) are effected each during a single pulse period of the drive pulse program. The particular advantages of each type of memory array can be realized in a memory array operative in a nondestructive mode which does not require clearance of a word address prior to information storage. Both the regenerative operation and clearance of the word address necessary in destructive and nondestructive memory arrays, respectively, increase cycle times so as to limit the operational speed of the computer system.

Also, in prior art memory arrays, information storage (write) is generally effected by "threshold logic" techniques in that a change in the binary state of a memory cell is effected by the linear addition of half-select drive pulses. When "threshold logic" techniques are employed, memory capacity and speed are often limited due to loading on the drive lines by the commoned memory cells. Such loading introduces dispersion effects in the propagation characteristics of the drive lines which can be significant when the length of the signal drive lines, generally transmission lines, is long. When drive pulses of fast rise time are employed, dispersion effects are characterized by a fast rise to some fraction of full amplitude followed by a slower rise to full amplitude of the drive pulse, such fraction being inversely dependent on the length of the drive line. In large capacity memory arrays, therefore, the triggering thresholds of some commoned memory cells is exceeded during the slower rise part of the drive pulse whereby cycle time is severely increased. Where "threshold logic" techniques are employed, dispersion effects cannot be compensated by overdriving techniques.

It is evident that reduced loading on the drive lines by the commoned memory cells and, also, avoidance of "threshold logic" techniques would loosen tolerances and, also, increase memory capacity. For example, avoidance of "threshold logic" techniques would materially loosen tolerance requirements on the triggering thresholds of the memory cells and, also, drive pulse amplitudes whereby overdriving techniques can be employed to achieve faster cycle times in large capacity memory arrays. In such event, the tolerance on drive pulse amplitudes is open-ended and drive pulse amplitude can be sufficiently large to allow event the last storage element commoned to the signal drive line to operate entirely on the fast rise part of such pulse. Accordingly, delay along the signal drive lines will be determined largely by the propagation velocity and not by dispersion effects.

Accordingly, an object of this invention is to provide an improved random access memory.

Another object of this invention is to provide a nondestructive random access memory wherein the need to clear a word address before information storage (write) is avoided.

Another object of this invention is to provide a random access memory array suitable for monolithic integration.

Another object of this invention is to provide a random access memory array providing sense signals close to normal current switch logic amplitudes.

Another object of this invention is to provide a memory cell wherein the tolerance on drive signal amplitude and triggering thresholds of the storage elements are unusually loose.

Another object of this invention is to provide a memory array wherein loading on signal drive lines is minimized.

These and other objects and features of this invention are achieved by the use of a current switch circuit in each memory cell which minimizes disturbance of the storage element except during a write "1" operation; operates as a current-driver for the storage element during a write "1" operation and as a transmission gate controlled by the state of the storage element during read "0" and read "1" operations whereby the available sense signal is not limited by the triggering threshold of the particular bistable storage element; insensitizes the operation of the memory circuit to further excursions of the word drive pulses; operates as a limiting current amplifier to minimize loading on the word and bit drive lines; and isolates the word and bit drive lines one from the other to eliminate sneak paths in the memory array.

In accordance with one embodiment of this invention, each memory cell in the array comprises a current switch including a shunting transistor and a gating transistor. During quiescent operation, the shunting transistor is "on" and the gating transistor is "off." By "on" and "off" is meant that circuit conditions are such as to support and not support normal transistor action. The gating transistor is particularly adapted as a current driving source for a bistable storage element, e.g., tunnel diode, transistor flip-flop, etc., arranged in its base circuit. When the word drive line is energized, the shunting transistor is driven "off" whereupon the memory cell is insensitive to further excursions of the word drive line. At this time, the gating transistor is biased either for normal transistor operation when the bit drive line is unenergized or for near-saturated operation when the bit drive line is concurrently energized. However, conduction in the gating transistor is controlled by the state of the storage element which determines the base bias voltage. The storage element exhibits sufficient difference in voltage levels of the stable states to support carrier injection into the base region of the gating transistor only when in the low voltage "0" state and while the word drive line is energized. More particularly, the gating transistor is driven into normal conduction during the read "0" and write "0" operations and is not driven into conduction during the read "1" operation; also, during the write "1" operation, the gating transistor is driven into saturation. While the gating transistor is saturated (write "1"), the major portion of emitter current $I_e$ is drawn largely from the base circuit and the resulting base current $I_b$ is sufficient to switch the storage element to the high voltage "1" state; when the gating transistor is biased for normal conduction (read "0" and write "0"), emitter current $I_e$ is drawn largely from the collector circuit, i.e., along the bit drive line, and transient base current $I_b$ is insufficient to disturb the state of the storage element. Accordingly, the operation of the gating transistor is nonlinear whereby write "1" and write "0" operations are distinguished by variations in the magnitude of base current $I_b$ and read "1" and read "0" operations are distinguished by variations in the magnitude of collector current $I_c$. The operation of the gating transistor is more particularly described in the copending Arnold S. Farber patent application Ser. No. 449,092, entitled "Random Access Memories Employing Threshold Type Devices," filed on even date herewith and assigned to a common assignee.

In accordance with another embodiment of this invention, nondestructive operation without the need to clear a word address prior to writing is achieved by the use of a bistable storage element having set and reset terminals connected in the respective base circuits of distinct gating transistors having collector electrodes connected to bit "0" and bit "1" drive lines, respectively. When the word drive line is energized, conduction in a particular one of the gating transistors is determined by the operating state of the storage element. When the word drive line and a selected bit drive line are concurrently energized (write), the corresponding gating transistor is driven into saturation only when the operating state of the storage element is to be switched; if the storage element is in the corresponding storage state, the gating transistor is inhibited. When driven into saturation, base current $I_b$ in the corresponding gating transistor is sufficient to switch the storage element to the desired storage state. Accordingly, a clear-to-zero operation is avoided. When the word drive line is singularly energized (read), the particular gating transistor is driven into normal conduction only when the storage element is not in the corresponding storage state. In accordance with another aspect of this invention, the shunting transistor can be eliminated and word drive pulses applied directly to the commoned emitter electrodes of the gating transistors. The magnitude of the word drive pulse is at least sufficient to support carrier injection into base region of a gating transistor when the storage element is in the corresponding storage state.

The foregoing and other objects, features, and advantages of the invention will be apparent from the following more particular description of preferred embodiments of the invention, as illustrated in the accompanying drawings.

Figure 1:
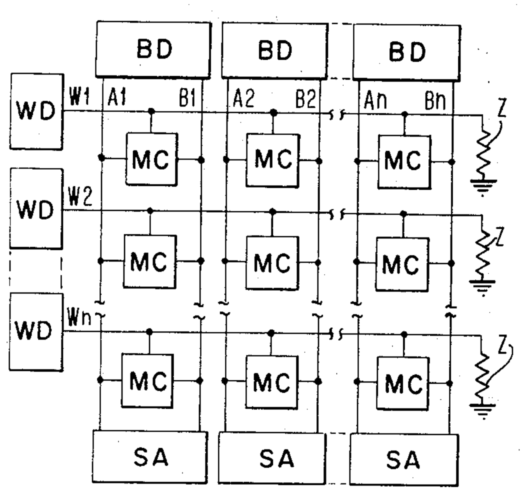
FIG. 1 is a block diagram illustrating a coordinate memory array in accordance with this invention.
Figure 2:
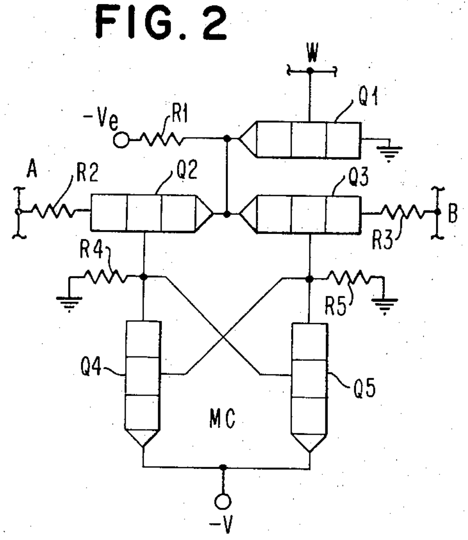
FIG. 2 is a schematic illustration of one embodiment of a memory cell useful in the array shown in FIG. 1.
Figure 5:
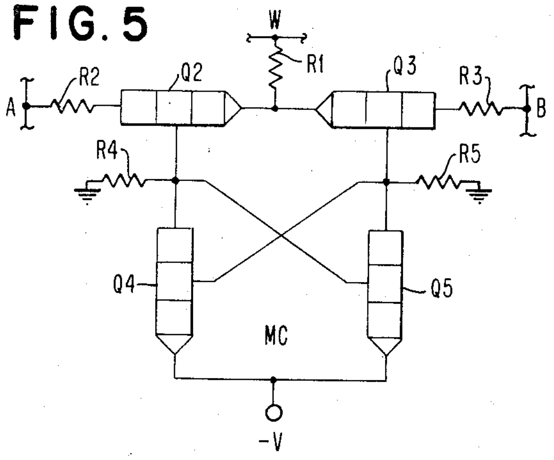
FIGS. 5 and 6 are additional embodiments of memory cells in accordance with this invention.

Referring to FIG. 1, a word-organized memory array in accordance with this invention is illustrated as comprising a plurality of word drive lines W1, W2, . . . W*n* and a plurality of pairs of bit drive lines A1 and B1, A2 and B2, . . . A*n* and B*n* arranged in coordinate fashion. A memory cell MC of the type shown in FIG. 2 or 5 is connected at each crossover point of a word drive line W and bit drive lines A and B. Each word drive line W and bit drive lines A and B can be formed as transmission lines. Each word drive line W is connected at one end to word driver WD and, if line length is significant, is terminated at the other end into its loaded characteristic impedance Z. Also, bit drive lines A and B are connected at one end to a bit driver BD and at the other end to a differential sense amplifier SA which discriminates against common mode noise. During a write operation, a bit driver BD is operative to selectively energize either connected bit drive line A or B to determine the particular information, either "1" or "0," to be stored in a corresponding memory cell MC when a corresponding word drive line W is concurrently energized. During a read operation, the presence of a sense signal on either A or B is indicative of a stored "0" or stored "1," respectively, in memory cell MC. The write and read operations of the memory array of FIG. 1 are hereinafter described.

A preferred embodiment of a memory cell in accordance with this invention is illustrated in FIG. 2 as comprising a current switch comprising shunting transistor Q1, nonlinear "gating" transistors Q2 and Q3, and a storage element including transistors Q4 and Q5 arranged in a conventional direct-coupled bistable arrangement. The transistors Q1, Q2, and Q3 are responsive to the particular energization of word drive line W and bit drive lines A and B to determine the operational state of the bistable arrangement Q4–Q5. As hereinafter described, gating transistors Q2 and Q3 are operative in nonlinear fashion such that the storage state of arrangements Q4 and Q5 determines which gating transistor responds to a word drive pulse, the operational mode, i.e., either saturated or unsaturated, being determined by the concurrent energization or nonenergization, respectively, of the bit drive line. During a write operation to change information stored in memory cell MC, either "0" to "1" or "1" to "0," circuit conditions are such that either gating transistor Q2 or Q3, respectively, is driven into saturation to switch the state of arrangement Q4–Q5. When a same bit of information is to be entered into memory cell MC, i.e., "0" to "0" or "1" to "1," circuit conditions are such that either gating transistor Q2 or Q3, respectively, is driven into normal conduction rather than into saturation whereby minimal base current $I_b$ is drawn and the state of arrangement Q4–Q5 is unchanged. Accordingly, the state of arrangement Q4–Q5 is switched during the write operation only when the information stored therein is to be changed. Accordingly, a clear-to-zero operation in the memory array of FIG. 1 prior to a write operation is avoided.

More particularly, shunting transistor Q1 is arranged as an emitter follower having base region connected to word drive line W, collector region connected to ground, and emitter region connected along resistor R1 to a negative source of voltage $-V_e$. Word drive line W is normally maintained at a positive voltage at least sufficient to support carrier injection into the base region of shunting transistor Q1 which is normally "on." At this time, a current equal to $(V_e-V_o)/R1$ flows into shunting transsistor Q1, where $V_o$ is the quiescent voltage developed across transistor Q1.

The emitter regions of gating transistors Q2 and Q3 are commoned to the junction of resistor R1 and the emitter region of shunting transistor Q1, the respective collector electrodes being connected along resistors R2 and R3 to bit drive lines A and B, respectively. The base regions of gating transistors Q2 and Q3 are connected to the collector electrodes of transistors Q4 and Q5, respectively, of memory cell MC. Quiescent voltage $V_o$ developed across shunting transistor Q1 is insufficient to support carrier injection into the base regions of gating transistors Q2 and Q3 regardless of the operational state of arrangement Q4–Q5. As hereinafter described, gating transistors Q2 and Q3 are operative as current driving sources for transistors Q4 and Q5, respectively, such driving currents corresponding to the base currents $I_b$ of the gating transistors. The collector regions of transistors Q4 and Q5 are directly coupled to the base region of the other to define a conventional bistable arrangement. The collector regions of transistors Q4 and Q5 are returned to ground along resistors R4 and R5, respectively, and the emitter regions are commoned to negative voltage source —V.

The storage state, i.e., "0" or "1," of memory cell MC is indicated by the state of the arrangement Q4–Q5. By definition, memory cell MC is in a stored "1" state when transistor Q4 is conducting. Also, the storage state of memory cell MC is reflected in the base biasing voltages applied to gating transistors Q2 and Q3.

Figure 4:
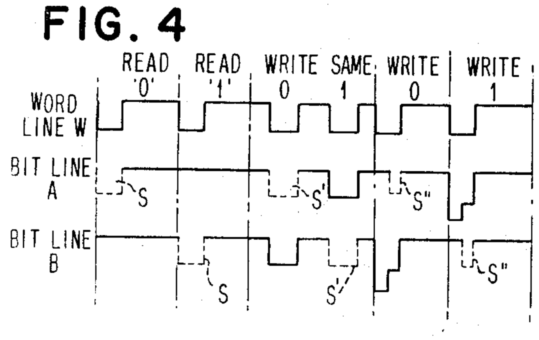
FIG. 4 is a time diagram illustrating the drive pulse sequence for effecting read and write operations in the memory array of FIG. 1.
Figure 3:
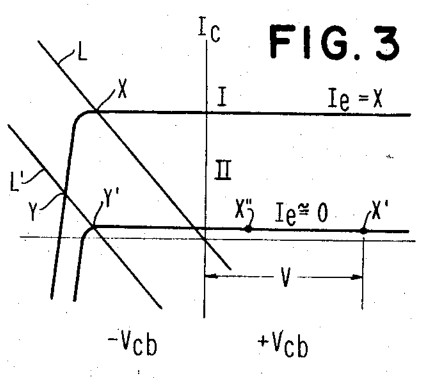
FIG. 3 illustrates the collector current-collector base voltage characteristics of a transistor device.

In describing the operation of the memory cell of FIG. 2, reference is made concurrently to FIGS. 3 and 4. FIG. 3 illustrates the collector current $I_c$ collector base voltage $V_{cb}$ characteristics of gating transistors Q2 and Q3, load line L and L′ being defined by the total collector circuit resistance when the corresponding bit drive line is unenergized and energized, respectively. As evident to those skilled in the art, when a gating transistor is operated along load line L, i.e., unsaturated, the major portion of emitter current $I_e$ flows in the collector circuit and minimal base current $I_b$ is drawn. On the other hand, when a gating transistor is operated along the load line L′, i.e., saturated, the major portion of emitter current $I_e$ flows in the base circuit. Accordingly, the operation of a gating transistor is nonlinear with respect to base current $I_b$. As hereinafter described, a gating transistor is driven into saturation only when the word drive line W and the corresponding bit drive line are energized, i.e., shunting transistor Q1 is inhibited, and the base bias voltage as determined by the storage state of memory cell MC supports carrier injection into the base region. In addition, reference is made to FIG. 4 which illustrates the drive pulse pattern necessary for effecting the read and write operations.

Assume that memory cell MC is in a stored "1" state, i.e., transistor Q4 is conducting. During quiescent operation, shunting transistor Q1 is conducting heavily and gating transistors Q2 and Q3 are "off." In the stored "1" state, base biasing voltage applied to gating transistors Q3 and Q2 are substantially equal to zero volts and —V volts, respectively. Also, when gating transistors Q2 and Q3 are silicon NPN-type transistors, voltage $V_o$ across switching transistor Q1 should not be more than approximately .6 volt more negatively than the maximum positive base biasing voltage, i.e., substantially zero volts, to insure such gating transistors are "off." Also, during quiescent operation, bit drive lines A and B are preferably unbiased and the operation of each of gating transistors Q2 and Q3 is defined by load line L in FIG. 3. Whether a gating transistor Q2 or Q3 is biased for saturated operation as defined by load line L′ when word drive line W is energized is determined by energizing the corresponding bit drive line A or B, respectively. However, conduction in a gating transistor is ultimately dependent upon the base biasing voltage as determined by the storage state of the memory cell MC, i.e., transistors Q4 and Q5.

A read operation is effected by a negative pulse directed along word drive line W by word driver WD and of sufficient amplitude to inhibit shunting transistor Q1. When shunting transistor Q1 turns "off," the voltage applied to the commoned emitter regions of gating transistors Q2 and Q3 becomes more negative. While memory cell MC is in a stored "1" state, i.e., transistor Q4 is conducting, circuit conditions support carrier injection into the base region of gating transistors Q3 and inhibit carrier injection into the base region of transistor Q2. While shunting transistor Q1 is "off," emitter voltage is limited to $-V_e$ and memory cell MC is insensitive to further excursions of the word drive pulse. The respective operations of gating transistors Q3 and Q2, since bit drive lines A and B, respectively, are unenergized, are defined by the intersection X of load line L and curve I and point X′, respectively, of FIG. 3. Gating transistor Q2 is operating at point X′ because of the negative voltage —V applied to the base region across resistor R4 when transistor Q4 is conducting. Curves I and II of FIG. 3 represent the operation of such gating transistor when emitter $I_e$ is equal to substantially zero and a finite current $x$. During the read "1" operation, emitter current $I_e$ in gating transistor Q3 is drawn largely from the collector circuit including bit drive line B and a negative pulse S therealong indicates the storage "1" state of memory cell MC; also, the absence of a negative pulse along bit drive line A is similarly indicative of the stored "1" state. Since gating transistor Q3 is not driven into saturation, any transient base current $I_b$ is insufficient to drop the base electrode of transistor Q4 whereby the storage state of memory cell MC is undisturbed. During the read "0" operation, i.e., transistor Q5 is conducting, circuit conditions support carrier injection into the base region of gating transistor Q2. Accordingly, the stored "0" state of memory cell MC is indicated by a negative pulse S appearing along bit drive line A and, conversely, the absence of a negative pulse along bit drive line B. Sense amplifier SA connected to bit drive lines A and B are strobed during a read operation.

It is to be particularly noted that gating transistors Q3 and Q2 are not driven into saturation during read "1" and read "0" operations, respectively, and, accordingly, draw only nominal base current $I_b$ which is of insufficient magnitude to switch the storage state of memory cell MC. Accordingly, readout is effected on a nondestructive basis. At the conclusion of the read cycle, normalization of word drive line W again supports carrier injection into the base region of switching transistor Q1 and quiescent conditons are re-established. During a read operation, gating transistors Q2 and Q3 operate, in effect, as amplifiers to provide a large amplitude sense signal S along bit drive lines A and B, respectively. The amplitude of the sense signal S thus developed is determined primarily by the magnitude of emitter current $I_e$ available to the gating transistor which is driven into conduction. Also, gating transistors Q2 and Q3 effectively eliminate sneak paths in the memory array since bit drive line A and B and the word drive line W are isolated by at least two back-biased junctions. In addition, each bit drive line A and B is lightly loaded due to the very high collector input impedance of gating transistors Q2 and Q3 of the cells connected therealong. Only one collector on the bit line is in the lower impedance saturated condition during a write operation.

A write operation is effected by the concurrent energization of word drive line W and a selected bit drive line A or B corresponding to the particular information "1" or "0" to be written into memory cell MC. A write operation is particularly distinguishable over the read operation hereinabove described in that energization of the selected bit drive lines A or B defines the operation of the corresponding gating transistor Q2 or Q3 along the load line L′ of FIG. 3. The write operation does not necessitate a clear-to-zero operation. When a same information is to be stored in memory cell MC, coincident energization of word drive line W and a selected one of bit drive lines A and B during the write "1" and write "0" operations, respectively, is ineffective to drive the corresponding gating transistors Q2 and Q3 into normal conduction. Rather, such conditions, in effect, duplicate the read "1" and read "0" operations, respectively, whereby gating transistors Q3 and Q2, respectively, are driven into normal conduction as shown by the "write same" operation in FIG. 4. A gating transistor is driven into saturation during a write operation only when information storage in memory cell MC is to be changed.

For example, consider that memory cell MC is in a stored "1" state, i.e., transistor Q4 is conducting, and negative drive pulses are concurrently directed along word drive line W and bit drive line A by drivers WD and BD, respectively, to effect a write "1" operation. At this time, shunting transistor Q1 is "off" and the respective operations of gating transistors Q3 and Q2 are defined by point X on load line L and point X″, respectively, of FIG. 3. Gating transistor Q2 is operating at point X″.

Since transistor Q4 is conducting, voltage —V across resistor R4 inhibits carrier injection into the base region of gating transistor Q2 and bit drive line A is energized. However, since transistor Q5 is not conducting, approximately zero volts are developed across resistor R5 whereby carriers are injected into the base region of gating transistor Q3. Since bit drive line B is unenergized, gating transistor Q3 supports normal transistor action as indicated by point X of FIG. 3, the resultant base current $I_b$ being insufficient to drop the base region of transistor Q44 and disturb the storage state of memory cell MC. Conduction through gating transistor Q3 is reflected as a negative pulse S′ along bit drive line B. Similarly, when memory cell MC is in a stored "0" state, concurrent energization of word drive line W and bit drive line B to effect a write "0" operation drives gating transistor Q2 into normal conduction whereby a negative pulse S′ is directed along bit drive line A. The "write same" operation closely approximates the read operation hereinabove described; however, sense amplifier SA is appropriately strobed to distinguish the read operation.

When information stored in memory cell MC is to be altered, appropriate gating transistor Q2 or Q3 is driven into saturation so as to switch memory cell MC to the appropriate state. For example, to effect the write "0" operation while memory cell MC is in a stored "1" state, word drive line W is energized and the concurrent energization of bit drive line B establishes the operation of gating transistor Q3 along the load line L′ of FIG. 3. Since transistor Q5 is not conducting, approximately zero volts are developed across resistor R5 and support carrier injection into the base region of gating transistor Q3; accordingly, gating transistor Q3 is driven into saturation and is operating at point Y defined by the intersection of load line L′ and curve II of FIG. 3. The resulting increase in base current $I_b$ in gating transistor Q3 drops the base current of transistor Q4 below that level necessary to support conduction whereupon memory cell MC switches to the stored "0" state. Similarly, when memory cell MC is in the stored "0" state, concurrent energization of word drive line W and bit drive line A to effect a write "1" operation drives gating transistor Q2 into saturation to switch the stored state of the memory cell.

While word drive line W and a selected bit drive line are energized to effect a write operation and subsequent to the switching of memory cell MC, circuit conditions duplicate a "write same" operation. For example, when memory cell MC switches to the stored "0" state, as described, the voltage across resistor R5 drops from approximately zero volts to —V volts and is insufficient to support carrier injection into the base region of gating transistor Q3. Conversely, the voltage across resistor R4 rises from approximately —V volts to approximately zero volts and thus establishes conditions to support normal transistor action in gating transistor Q2. Accordingly, if the time duration of the drive pulses exceed the switching time of memory cell MC, carrier injection into the base region of gating transistor Q3 reduces and carrier injection into the base region of gating transistor Q2 increases upon memory cell MC switching to the stored "0" state. The signal appearing long bit drive line B prior to memory cell MC switching to stored "0" state consists of the negative drive pulse and a superimposed "read" pulse due to conduction in gating transistor Q3. When memory cell MC has switched to the stored "0" state, normal transistor action is supported in gating transistor Q2 and circuit conditions approximate a "write same" operation, as hereinabove described, the rate of change of carrier injection into the base region of gating transistor Q2 being determined by the switching time of memory cell MC. Gating transistor Q2 is not driven into saturation since bit drive line A is unenergized and the resulting base current $I_b$ is insufficient to disturbe the storage state of memory cell MC. Conduction in gating transistor Q2 at this time is reflected as a negative pulse S″ along bit drive line B. Similarly, when memory cell MC has switched to a stored "1" state during a write "1" operation, gating transistor Q3 can be momentarily driven into conduction whereby a short negative pulse S″ is directed along bit drive line B.

An alternative embodiment of a memory cell MC of this invention is illustrated in FIG. 5 wherein like references have been employed to indicate corresponding structures. In FIG. 5, the circuit arrangement is distinguishable in that shunting transistor Q1 of FIG. 2 has been eliminated and word drive line W is connected along the resistor R1 to the emitter regions of gating transistors Q2 and Q3. The operation of the circuit arrangement of FIG. 5 is substantially identical to that described with respect to the embodiment of FIG. 2. However, when a gating transistor is driven into conduction, commoned emitters of both gating transistors are effectively clamped whereby the state of the transistor is insensitive to furher excursions of the word drive pulse. For example, when word drive line W is energized by a negative drive pulse of amplitude $-V_e$, emitter current $I_e$ is available to gating transistors Q2 and Q3. Transistors Q2 and Q3 again operate as nonlinear devices, the operational mode, i.e., saturation or unsaturation, when word drive line W is energized being determined by the concurrent energization or nonenergization, respectively, of the corresponding bit line A or B and conduction therethrough being controlled by the storage state of memory cell MC. During a read operation, either "0" or "1," either gating transistor Q2 or Q3 is biased for unsaturated operation as indicated by the load line L of FIG. 3. Similarly, during a write operation, concurrent energization of bit drive line A or B with word drive line W biases either gating transistor Q2 or Q3, respectively, for saturated operation as indicated by load line L′ of FIG. 3. The operation of the circuit arrangement of FIG. 5, therefore, essentially duplicates that described with respect to FIG. 2. Elimination of shunting transistor Q1 is not preferred since dynamic loading on word drive line W by the memory cell is somewhat increased. On the other hand, the arrangement of FIG. 5 has less standby power dissipation than that of FIG. 2.

Figure 6:
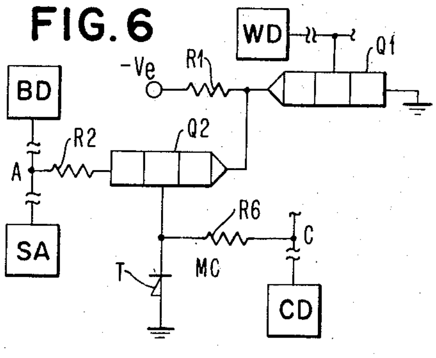

A further embodiment of this invention is illustrated in FIG. 6 wherein tunnel diode T is substituted for the bistable arrangement Q4–Q5 and a single gating transistor Q2 is required. It is evident that other bistable arrangements, e.g., transistor flip-flops, can be substituted for tunnel diode T when such arrangements exhibit a sufficient voltage difference in the binary states and the reset terminal impedance connected to the base region of gating transistor Q2 is low. In the arrangement of FIG. 6 a clear-to-zero operation is required prior to a write operation; however, the operation of shunting transistor Q1 and gating transistor Q2 is essentially as hereinabove described with respect to FIG. 2. As shown, tunnel diode T is connected between the base region of gating transistor Q2 and ground, the junction of the base region and the cathode of tunnel diode T being connected along resistor R6 to clear drive line C. The tunnel diode T is biased for bistable operation by the normal voltage along clear drive line C and resistor R6. The voltage across tunnel diode T in the low voltage "0" state is sufficient to support carrier injection into the base region of gating transistor Q2 when shunting transistor Q1 is "off." Conversely, the voltage across tunnel diode T in the high voltage "1" state is insufficient to support carrier injection into the base region of gating transistor Q2 when word drive line W is energized. If the high voltage "1" state of tunnel diode T is sufficient to prevent normal transistor action in gating transistor Q2 when the emitter voltage is equal to $-V_e$, no disturbance appears along bit drive line A regardless of further excursions of the word drive pulse.

A write operation is initiated when clear drive line C is positively energized by pulse source CD to switch tunnel diode T to the low voltage "0" state. Subsequently, word drive line W is energized negatively by word driver WD to inhibit conduction in shunting transistor Q1 whereby emitter current $I_e$ is available to gating transistor Q2. During the write "0" operation, bit drive line A is unenergized and gating transistor Q2 is driven into normal conduction as indicated by point X of FIG. 3; transient base current $I_b$ at this time is insufficient to switch tunnel diode T to the high voltage "1" state. During the write "1" operation, bit drive line A is concurrently energized and gating transistor Q2 is driven into saturation as indicated by point Y of FIG. 3. The magnitude of base current $I_b$ in transistor Q2 when saturated is sufficient to switch tunnel diode T to the high voltage state.

The read operations are effected when word drive line W is negatively energized by word driver WD to inhibit conduction in shunting transistor Q1. Again, gating transistor Q2 is biased for normal transistor action along load line L of FIG. 3, conduction in the gating transistor being ultimately dependent upon the state of tunnel diode T. When tunnel diode T is in the low voltage "0" state, gating transistor Q2 is driven into normal conduction as indicated by X in FIG. 3 and emitter current $I_e$ is drawn largely along bit drive line A to indicate a stored "0" in memory cell MC. However, when tunnel diode T is in the high voltage "1" state, carrier injection into the base region of gating transistor Q2 is inhibited as indicated by point X' in FIG. 3. Accordingly, an absence of a current pulse along the bit drive line A during a read operation is indicative of a stored "1" in memory cell MC.

While the invention has been particularly shown and described with reference to preferred embodiments thereof, it will be understood by those skilled in the art that various changs in form and details may be made therein without departing from the spirit and scope of the invention.

What is claimed is:

1. In a memory array, a word and first bit drive line defining a crossover point, a memory cell connected at said crossover point comprising a first transistor having a base, emitter, and collector and a bistable device connected at said base, said bistable device exhibiting a first and a second storage state, first driving means connected to said collector along said first bit drive line for normally biasing said collector for normal transistor operation and, when operated, for near-saturated operation, biasing means connected to said emitter for supporting conduction in said first transistor while said bistable device is in said first storage state, means for inhibiting said biasing means whereby said first transistor is normally nonconducting, and second driving means connected to said inhibiting means along said word drive line for disabling said inhibiting means whereby, while said bistable device is in said first storage state, said first transistor supports normal transistor operation when said second driving means is singularly energized and is driven into saturation when said first and said second driving means are concurrently energized, said bistable device being responsive to said first transistor when saturated to switch from said first to said second storage state.

2. A memory array as defined in claim 1 wherein said bistable device is a tunnel diode.

3. A memory array as defined in claim 1 wherein said inhibiting means includes a second transistor defining a current switch with said first transistor, said second transistor having an emitter connected to said emitter of said first transistor, a base connected to said second driving means along said word drive line, and a collector connected to a potential source whereby said second transistor is normally conducting, said second driving means being operative to control the conductive state of said second transistor.

4. A memory array as defined in claim 1 wherein the voltage difference between said first and said second storage states of said bistable device is sufficient and insufficient, respectively, to support conduction in said first transistor while said second driving means is energized.

5. A memory array as defined in claim 1 further including sensing means connected to said collector of said first transistor along said bit drive line for ascertaining the storage state of said bistable device.

6. A memory array as defined in claim 1 further including means for switching said bistable device from said second to said first storage state.

7. A memory array as defined in claim 6 further including a second bit drive line defining with said word and first bit drive lines said crossover point and third driving means connected to said second bit drive line, and wherein said switching means includes a third transistor of same conductivity type as said first transistor, said third transistor including an emitter connected to said emitter of said first transistor, a base connected to said bistable device, said third driving means being connected along said second bit drive line to the collector of said third transistor for normally biasing said collector of said third transistor for normal transistor operation and, when operated, for near-saturated operation, said biasing means being operative to support conduction in said third transistor when said bistable device is in said second storage state whereby, while said bistable device is in said second storage state, said third transistor supports normal transistor operation when said second driving means is singularly energized and is driven into saturation when said second and said third driving means are concurrently energized, said bistable device being responsive to said third transistor when saturated to switch from said second to said first storage state.

8. A memory array as defined in claim 7 further including sensing means connected to said collector of said third transistor along said second bit drive line for ascertaining the storage state of said bistable device.

9. A memory array comprising a plurality of word drive lines, a plurality of first and second bit drive lines, said word drive lines being arranged in coordinate fashion with said first and said second bit drive lines to define a plurality of crossover points, a memory cell having a first and a second storage state and arranged at each crossover point, first driver means for selectively energizing said word drive line, second driver means for selectively energizing said first and said second bit drive lines on an individual basis, first means responsive to said word drive line and said first bit drive line when concurrently energized for switching said memory cell from said first to said second storage state, second means responsive to said word drive line and said second bit drive line when concurrently energized for switching said memory cell from said second to said first storage state, and means conductively connected to and directly responsive to said word drive line when energized to ascertain the storage state of said memory cell.

10. In a memory array, a plurality of word drive lines, a plurality of first and second drive bit drive lines, said word drive lines being arranged in coordinate fashion with said first and said second bit drive lines to define a plurality of crossover points, a memory cell arranged at each crossover point and including first and second gating transistors having emitter-collector circuits connected between said word drive line and said first and said second bit drive lines, respectively, and first and second base circuits, respectively, a bistable storage device exhibiting first and second storage states and having first and second input terminals connected in said first and said second base circuits, respectively, the storage state of said bistable device being reflected by first and second voltages at said first and said second input terminals, respectively, means connected to said emitter-collector circuits of said first and said second transistors along said word drive line and said first and said second bit drive lines, respectively, for biasing said first and said second transistors on an individual basis for normal transistor operation and for saturated operation, said first base circuit supporting conduction in said first transistor while said bistable device is in said first storage state and said second base circuit supporting conduction in said second transistor while said bistable device is in said second storage state, said first and said second input terminals being energized when the first and said second gating transistors, respectively, are operated in saturation to switch said bistable device between said first and second storage states.

11. A memory cell comprising a storage element having first and second input terminals and exhibiting first and second storage states, first and second gating transistors having emitter-collector circuits and bases connected to said first and said second input terminals, respectively, means connected to said emitter-collector circuits of said first and said second gating transistors for individually biasing said first and said second gating transistors for normal transistor operation and for saturated operation, conduction in said first gating transistor being inhibited when said storage element is in said first storage state and supported when said storage element is in said second storage state, conduction in said second gating transistor being inhibited when said storage element is in said second storage state and supported when said storage element is in said first storage state, said storage element being responsive to said first and said second gating transistors, when saturated, to switch said first and said second voltage states, respectively, and sensing means connected in said emitter-collector circuits of said first and said second gating transistors, respectively, for ascertaining the storage state of said storage element, said storage states being indicated by conduction in said first and said second gating transistors, respectively.

12. A memory cell comprising first and second gating transistors, each gating transistor having an emitter-collector circuit and a base circuit, a bistable storage element having first and second storage states and first and second input terminals connected in said base circuits of said first and said second gating transistors, respectively, means connected to said emitter-collector circuits of said first and said second gating transistors, respectively, for individually biasing said first and said second gating transistors for a first conduction state and a second conduction state, said base circuit of said first gating transistor supporting conduction in said first gating transistor when said biasing means is energized and said storage element is in said second storage state, said base circuit of said second gating transistor supporting conduction in said second gating transistor when said biasing means is energized and said storage element is in said first storage state, said storage element being responsive to said first and said second gating transistors, respectively, while operated in said second conduction state to switch between said first and said second storage states.

13. A memory cell comprising first and second transistors of same conductivity type and each transistor having an emitter and collector and a base circuit, a bistable storage element having first and second storage states and first and second input terminals connected in said base circuits of said first and second transistors, respectively, first means connected to said collector of said first transistor, second means connected to said collector of said second transistor, third means connected to said emitters of said first and said second transistors, said first and said second transistors being biased for normal transistor operation when said third means is singularly energized, said first and said second transistors being biased for saturated operation when said first and said second means, respectively, and said third means are concurrently energized, said base circuits of said first and said second transistors supporting conduction in said first and said second transistors, respectively, while said storage element is in said first and said second storage states, respectively, said storage element being responsive to said first and said second transistors when saturated to switch between said first and said second storage states, respectively, and sensing means connected to said collectors of said first and said second transistors, respectively, for ascertaining the storage state of said storage element, said first and said second storage states being indicated by normal transistor operation in said first and said second transistors, respectively, when said third means is singularly energized.

14. A memory cell as defined in claim 13 wherein said third means includes driving means connected to said emitters of said first and said second transistors.

15. A memory cell as defined in claim 13 wherein said first and said second means each includes driving means connected to said collector electrodes of said first and said second gating transistors, respectively.

16. A memory cell as defined in claim 13 wherein said storage element comprises a bistable transistor arrangement.

17. A memory cell as defined in claim 13 wherein said third means includes a current source connected to said emitter electrodes of said first and said gating transistors and effective to bias said first and said second transistors for normal transistor operation, and shunting means connected to said emitter electrodes of said first and said second gating transistors for inhibiting said current source.

18. A memory cell as defined in claim 17 wherein said shunting means includes a third transistor, said third transistor being normally conductive, and means for inhibiting conduction in said third transistor whereby said first and said second transistors are biased for normal transistor operation.

References Cited

UNITED STATES PATENTS

| | | | |
|---|---|---|---|
| 2,579,336 | 9/1950 | Rack | 307—88.5 |
| 2,997,605 | 2/1959 | Fortini | 307—88.5 |
| 3,218,613 | 11/1965 | Gribble | 340—173 |

OTHER REFERENCES

Schmidt, John D.: "Integrated MOS Transistor Random Access Memory," Solid State Devices, pp. 21–25, January 1965.

BERNARD KONICK, *Primary Examiner.*

J. F. BREIMAYER, *Assistant Examiner.*